United States Patent
Speziale

(10) Patent No.: US 6,184,468 B1
(45) Date of Patent: Feb. 6, 2001

(54) ELECTRICAL BOX WITH SEMI-ATTACHED ADAPTOR

(76) Inventor: Joseph L. Speziale, 1973 82nd St., Brooklyn, NY (US) 11214

(*) Notice: Under 35 U.S.C. 154(b), the term of this patent shall be extended for 0 days.

(21) Appl. No.: 09/255,458

(22) Filed: Feb. 22, 1999

(51) Int. Cl.⁷ .................................................. H02G 3/14
(52) U.S. Cl. .............................. 174/66; 220/3.8; 220/241
(58) Field of Search .................................. 174/50, 53, 58, 174/66; 220/241, 3.8, 3.2, 3.3, 3.5

(56) References Cited

U.S. PATENT DOCUMENTS

| | | | |
|---|---|---|---|
| 2,573,260 | 10/1951 | Gorman | 220/3.4 |
| 2,666,546 | 1/1954 | Reilly | 220/3.4 |
| 2,791,345 | 5/1957 | Troutman | 220/3.4 |
| 2,854,501 * | 9/1958 | Ludwig | 174/53 |
| 2,898,688 | 8/1959 | Cottar | 33/189 |
| 3,015,408 | 1/1962 | Campbell et al. | 220/3.4 |
| 3,472,945 * | 10/1969 | Tractenberg | 174/53 |
| 3,601,276 | 8/1971 | Culpepper | 220/3.8 |
| 3,619,477 | 11/1971 | Rasmussen | 174/66 |
| 3,745,664 | 7/1973 | Altseimer | 33/174 G |
| 4,359,619 | 11/1982 | Bergoltz | 200/333 |
| 4,381,063 * | 4/1983 | Leong | 220/3.8 X |
| 4,399,922 * | 8/1983 | Horsley | 174/53 |
| 4,589,211 | 5/1986 | Policka | 33/189 |
| 4,712,157 * | 12/1987 | Simonson et al. | 174/58 X |
| 4,802,284 | 2/1989 | Jackson | 33/528 |
| 4,907,711 | 3/1990 | Stuchlik, III | 220/3.8 |
| 4,953,733 | 9/1990 | Loscuito | 220/3.4 |
| 5,280,135 * | 1/1994 | Berlin et al. | 174/67 |
| 5,283,391 | 2/1994 | Ozeki | 174/48 |
| 5,357,053 | 10/1994 | Manaras | 174/48 |
| 5,413,501 | 5/1995 | Munn | 439/535 |
| 5,424,587 | 6/1995 | Federowicz | 307/140 |
| 5,466,886 | 11/1995 | Lengyel et al. | 174/48 |
| 5,526,952 | 6/1996 | Green | 220/3.8 |
| 5,699,221 * | 12/1997 | O'Leary et al. | 174/66 X |
| 5,731,544 * | 3/1998 | Burck et al. | 174/66 |
| 5,804,765 * | 9/1998 | Siemon et al. | 174/65 R |
| 5,955,702 * | 9/1999 | Grossman et al. | 174/66 |

* cited by examiner

Primary Examiner—Dean A. Richard
(74) Attorney, Agent, or Firm—John R. Mugno

(57) ABSTRACT

An electrical housing assembly is shown which is adapted to be affixed behind a finished surface such as a wall or ceiling and is designed to receive an electrical device which will be exposed outwardly from the finished surface wherein the housing assembly is comprised of an electrical box which has an open side to permit an electrician to easily inspect or conduct work on the wiring contained within the housing. The electrical box includes punch-outs which permit external wiring to be inserted within the box opening. A frame-shaped flat adaptor which is designed to affix an electrical device thereto is attached to the electrical box by a hinge assembly which permits the adaptor to remain coupled to the electrical box in both a closed position and an open position. A fastener, such as a snap-on clip, secures the adaptor to the electrical box in the closed position when desired by the electrician, but is also easily detachable.

4 Claims, 7 Drawing Sheets

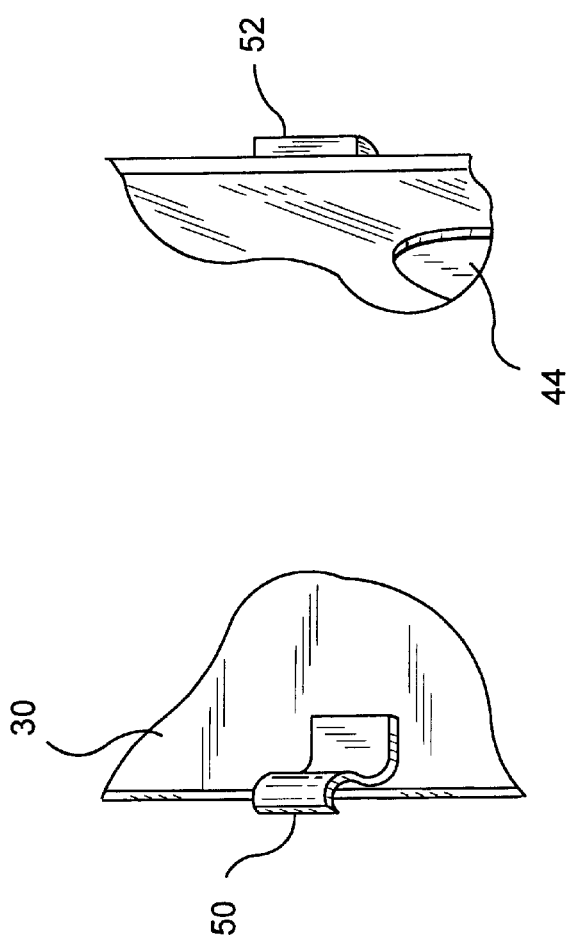
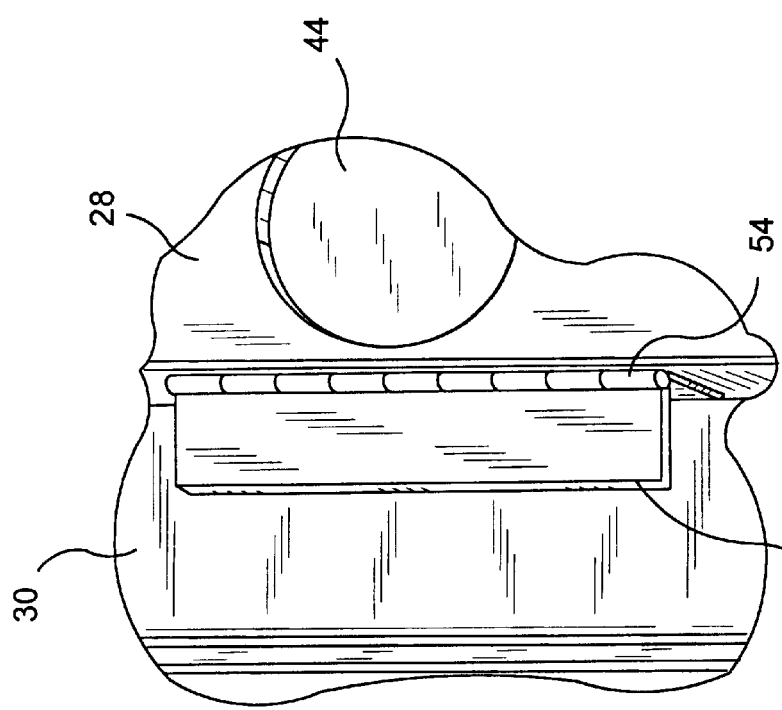

ELECTRICAL BOX WITH SEMI-ATTACHED ADAPTOR

FIELD OF THE INVENTION

This invention is generally directed to an electrical box and adaptor combination used for electrical cable terminations in various applications such as telephone wiring, electrical power sources, cable T.V., etc. Such electrical box and adaptor combinations are used to accommodate electrical devices such as switches, electrical outlets, electrical sockets, phone jacks, etc. and are embedded behind finished walls. The electrical box and adaptor combination of the present invention provides a semi-attached adaptor which is unitary with the electrical box in either an open or closed position thereby facilitating the electrician's installation and minimizing the risk of loss of, or damage to, the adaptor.

BACKGROUND OF THE INVENTION

Obviously, for purposes of both safety and aesthetics, electrical wiring exists behind finished surfaces (e.g., walls and ceilings) in modern structures. External to the finished surfaces are typically control or indicator devices such as switches, electrical outlets, phone jacks and the like. While the electrical boxes that contain the wire or cable terminations are hidden from view behind finished surfaces, they must be made easily accessible for purposes of repair or inspection. In new buildings, a certificate of occupancy typically cannot be granted without inspection by an electrician to ensure that all wiring complies with local safety codes.

Electrical boxes can be installed in either wet wall or dry wall applications as is well-known in the art. In a wet wall application, the electrical box typically has a strut which extends into the wet, pliable surface becomes firmly implanted when the or wall dries and hardens. In a dry wall application, the electrical box is internally attached to the structure on wooden studs. In either application, the open portion of the electrical box extends outward (e.g., downward from a ceiling mount in internal applications). FIG. 1 shows a prior art electrical box generally designated 10. Electrical box 10 can have various dimensions; however, under most electrical codes implemented today, electrical box 10 typically would be 4 inches by 4 inches by 2 inches or 5 inches by 5 inches by 2 inches. Prior art electrical box 10 is comprised of steel but incorporates weakened punch-outs 12 which can easily be detached from electrical box 10 to create circular holes in which to run cables or wires. In FIG. 1, punch-outs 12 are available on all surfaces of electrical box 10 to avoid recircuiting of the direction of any cable or wire to be terminated in electrical box 12. The bending of cables or wires around the edges of electrical box 12 can fray the cables and wires resulting in electrical shorting and the creation of a fire hazard.

Prior art electrical box 10 also includes a pair of diagonally opposed mounting ears 14. Mounting ears 14 each have a screw hole 16 to receive and connect an adaptor 18 as shown it FIG. 2. Adaptor 18 includes four curved slots 20 which permit adaptor 18 to be attached to electrical box 10 by the coupling of two diagonally opposed curved slots 20 being screwed to mounting ears 14 by means of a screw (not visible) which has a head wider than curved slot 20. Adaptor 18 can be coupled to electrical box 10 so that the rectangular opening of adaptor 18 can receive an electrical device in either a horizontal or vertical position.

Adaptor 18 serves numerous purposes in the installation of electrical devices. First, adaptor 18 serves a somewhat protective function in that once all necessary electrical wiring is completed in electrical box 10, adaptor 18 narrows this opening to avoid debris from entering. This narrowing of the opening of electrical box 10 by adaptor 18 also permits the rigid attachment of standard-size electrical devices to adaptor 18 (and thus electrical box 10). In this regard, adaptor 18 comprises two opposite mounting ears 22 which each incorporate a screw hole 24. A standard rectangular device such as a switch, socket, etc. is easily attached by means of screws (not visible) connecting the electrical device and adaptor 18. Adaptor 18 can also be comprised of various thicknesses to ensure that the electrical device (or more specifically, its exterior cover) rests flush against a finished wall. For instance, if one-half inch plywood will ultimately be utilized as a wall surface, the adaptor would have a similar thickness so that the net result would not be that the electrical box was indented in the finished wall. FIG. 3 shows electrical box 10 and adaptor 18 connected by a pair of diagonally opposed screws 26. No wiring or cable terminations have been illustrated in order to facilitate the viewing of the diagrams.

The prior art electrical box and adaptor combination as described in conjunction with FIGS. 1–3 has numerous shortcomings. First, the necessity of totally detaching adaptor 18 from electrical box 10 each time work is conducted within electrical box 10 substantially increases the likelihood of the loss of screws 26, the weakening of mounting ears 14, the disconfiguration of curved slots 20, and that the adaptor will become lost or its shape disrupted. This problem often results in the need for an electrician to maintain spare sets of adaptors 18 and screws 26, thereby resulting in increased costs. Furthermore, because the opening and closing of electrical box 10 is so time-consuming, any repair or installation of electrical box 18 is unduly burdensome.

It is, therefore, a primary object of the present invention to provide a new and improved electrical box and adaptor combination.

It is another object of the present invention to provide a new and improved electrical box and adaptor combination whereby the adaptor remains attached to the electrical box in both its open and closed position.

It is yet a further object of the present invention to provide a new and improved electrical box and adaptor combination which saves time for an electrician by requiring no tools to open or close the electrical box.

It is still another object of the present invention to provide a new and improved electrical box and adaptor combination which permits easy replacement of the adaptor.

Further objects and advantages of the present invention will become apparent as the following description proceeds.

SUMMARY OF THE INVENTION

Briefly stated and in accordance with the preferred embodiment of the present invention, an electrical housing assembly is shown which is adapted to be affixed behind a finished surface such as a wall or ceiling and is designed to receive an electrical device which will be exposed outwardly from the finished surface wherein the housing assembly is comprised of an electrical box which has an open side to permit an electrician to easily inspect or conduct work on the wiring contained within the housing. The electrical box includes punch-outs which permit external wiring to be inserted within the box opening. A frame-shaped flat adaptor which is designed to affix an electrical device thereto is attached to the electrical box by a hinge assembly which permits the adaptor to remain coupled to the electrical box in both a closed position and an open position. A fastener, such as a snap-on clip, secures the adaptor to the electrical box in the closed position when desired by the electrician, but is also easily detachable.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

FIG. 6 is an exploded view of the hinge assembly of FIG. 4 in accordance with the present invention;

FIG. 7 is an exploded view of the snap-on clip of FIG. 4 incorporated on a adaptor in accordance with the present invention;

FIG. 8 is an exploded view of the mating ridge of FIG. 4 on an electrical box which easily engages and disengages from the snap-on clip of FIG. 7 in accordance with the present invention.

DESCRIPTION OF THE PREFERRED EMBODIMENT

Figure 1:
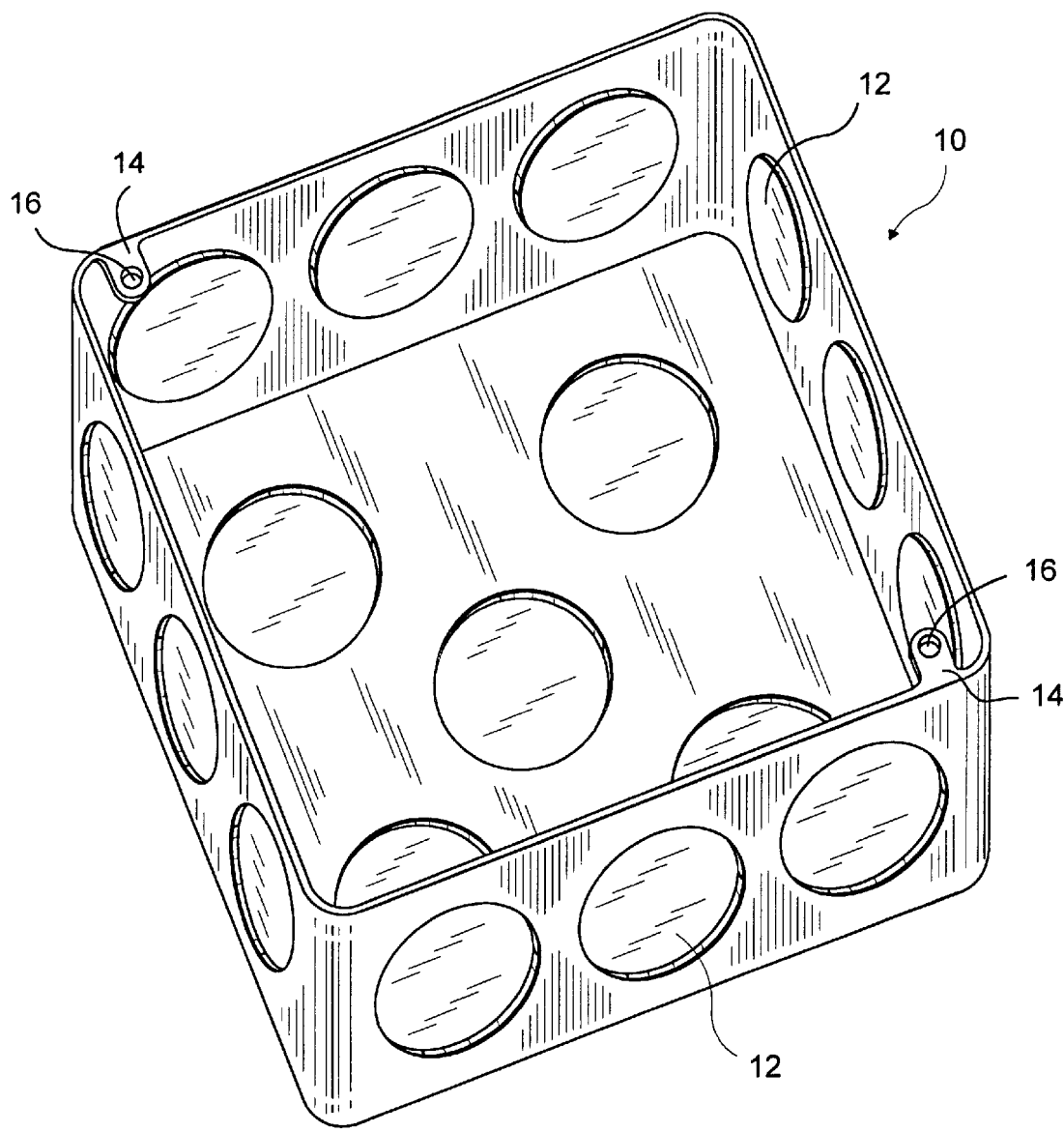
FIG. 1 is a perspective view of a standard electrical box as utilized in the prior art.
Figure 2:
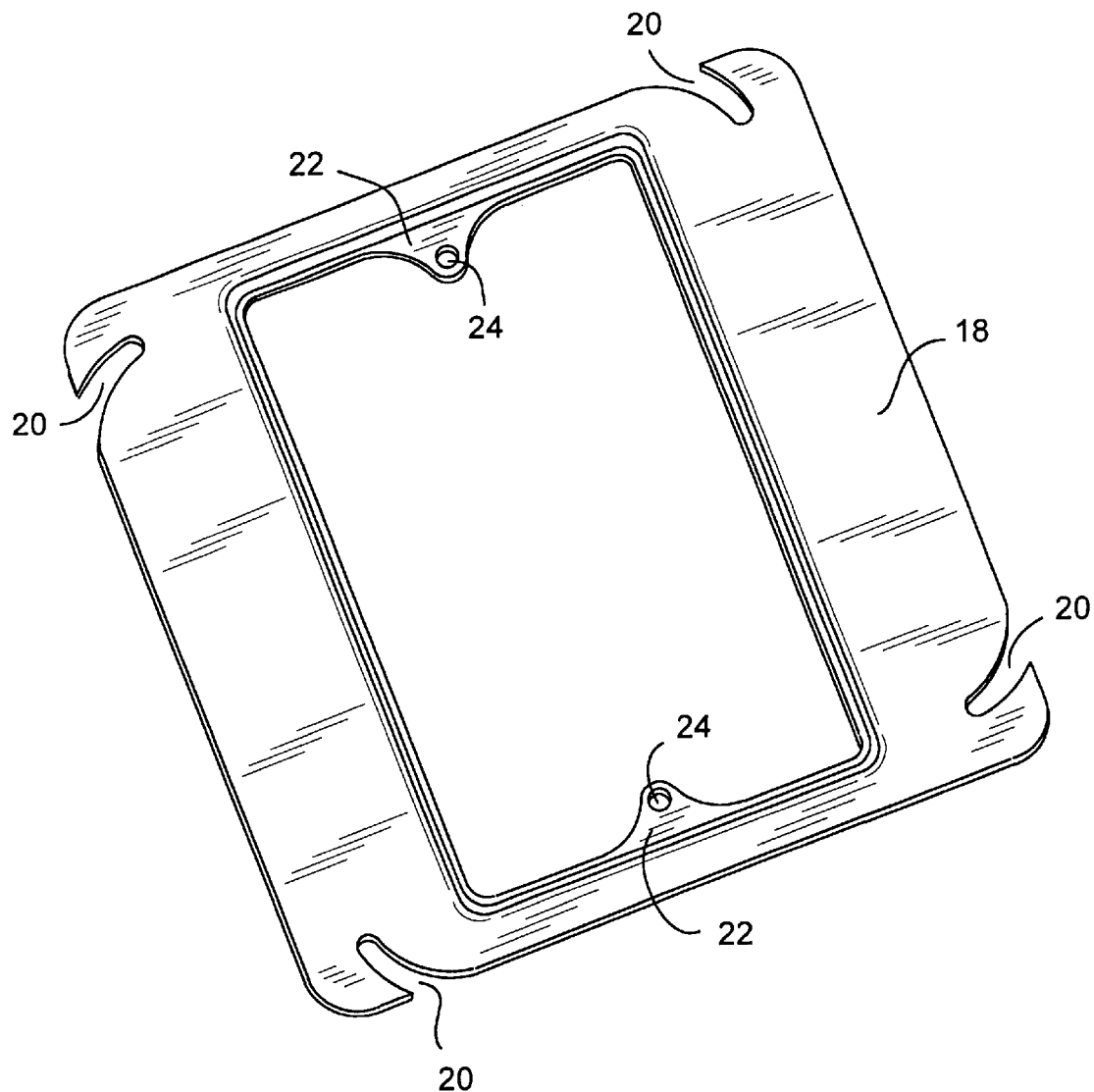
FIG. 2 is a schematic view of a standard adaptor as utilized in the prior art.
Figure 3:
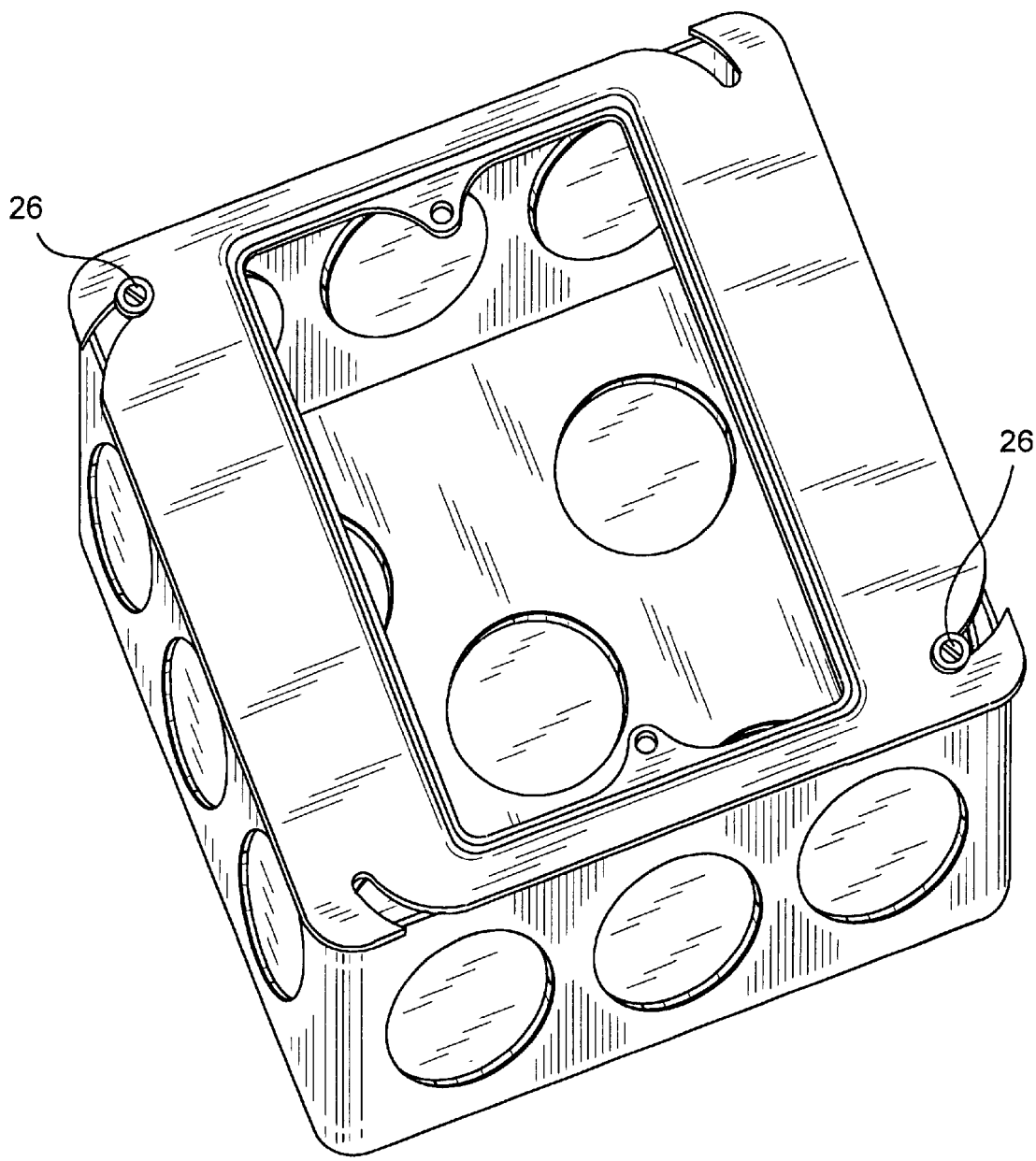
FIG. 3 is a schematic view of the combined electrical box of FIG. 1 and adaptor of FIG. 2 in a closed position as utilized in the prior art.
Figure 4:
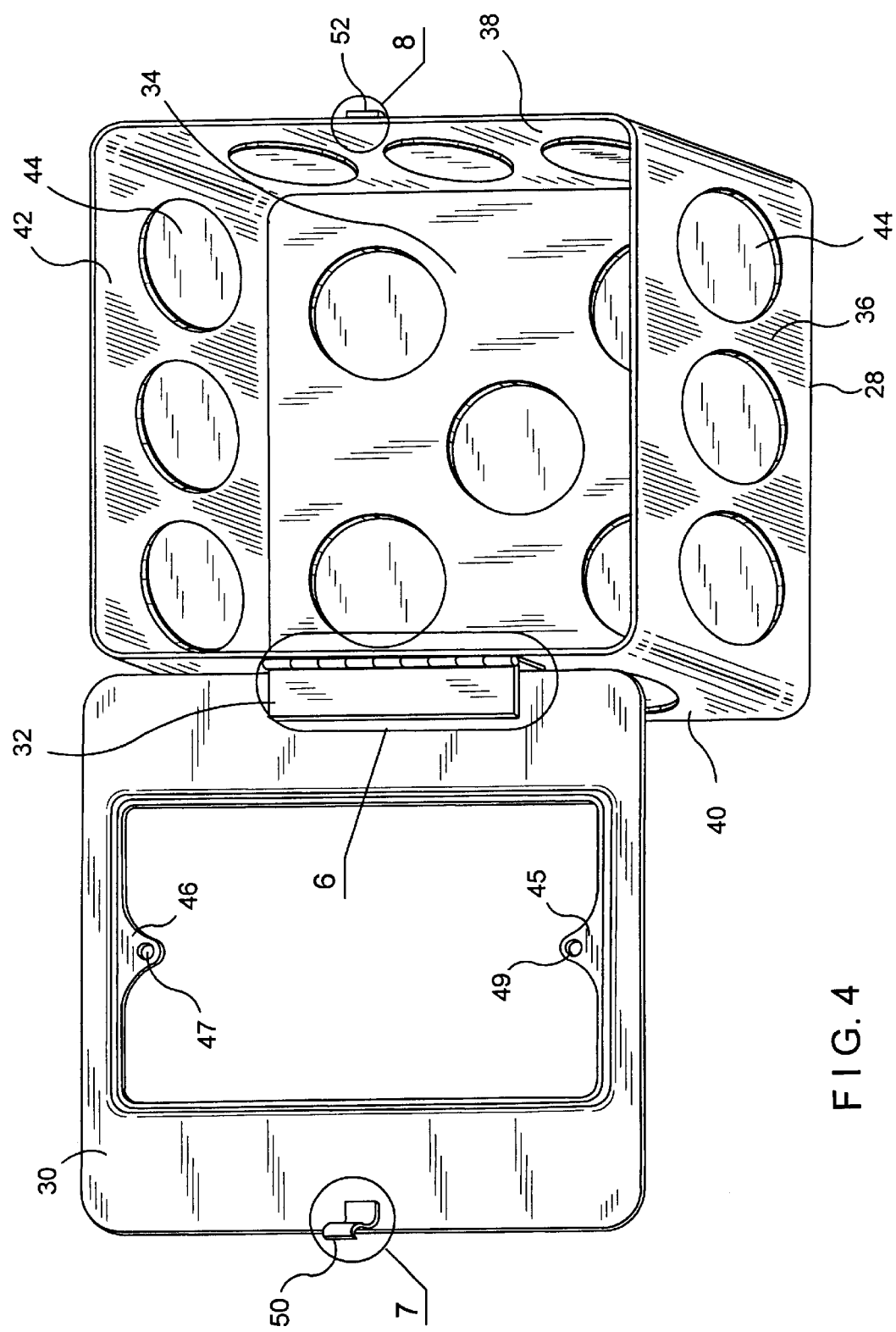
FIG. 4 is a schematic illustration of a hinged electrical and adaptor combination in an open position in accordance with the present invention.

Referring to FIG. 4, an electrical box 28 of the present invention is shown coupled to a frame-shaped adaptor 30 by means of a hinge assembly 32. In FIG. 4, the combination of electrical box 28 and adaptor 30 is shown in an open position. In the open position, an inspector or electrician can easily view and work on the wiring contained within, or inserted into, electrical box 28. Although electrical box 28 is typically comprised of a unitary steel construction, it can be viewed as comprising a back plate 34 and sidewalls 36, 38, 40 and 42 which have edges extending perpendicularly from the edges of back plate 34. In effect, a hollow protected area is formed by the inside surfaces of back plate 34 and sidewalls 36, 38, 40 and 42. Any wire or cable terminations will occur within this protected area. Back plate 34 and sidewalls 36, 38, 40 and 42 are each illustrated having a plurality of punch-outs 44 which can easily be removed to permit a cable to be inserted into the protected area from outside electrical box 28.

Figure 5:
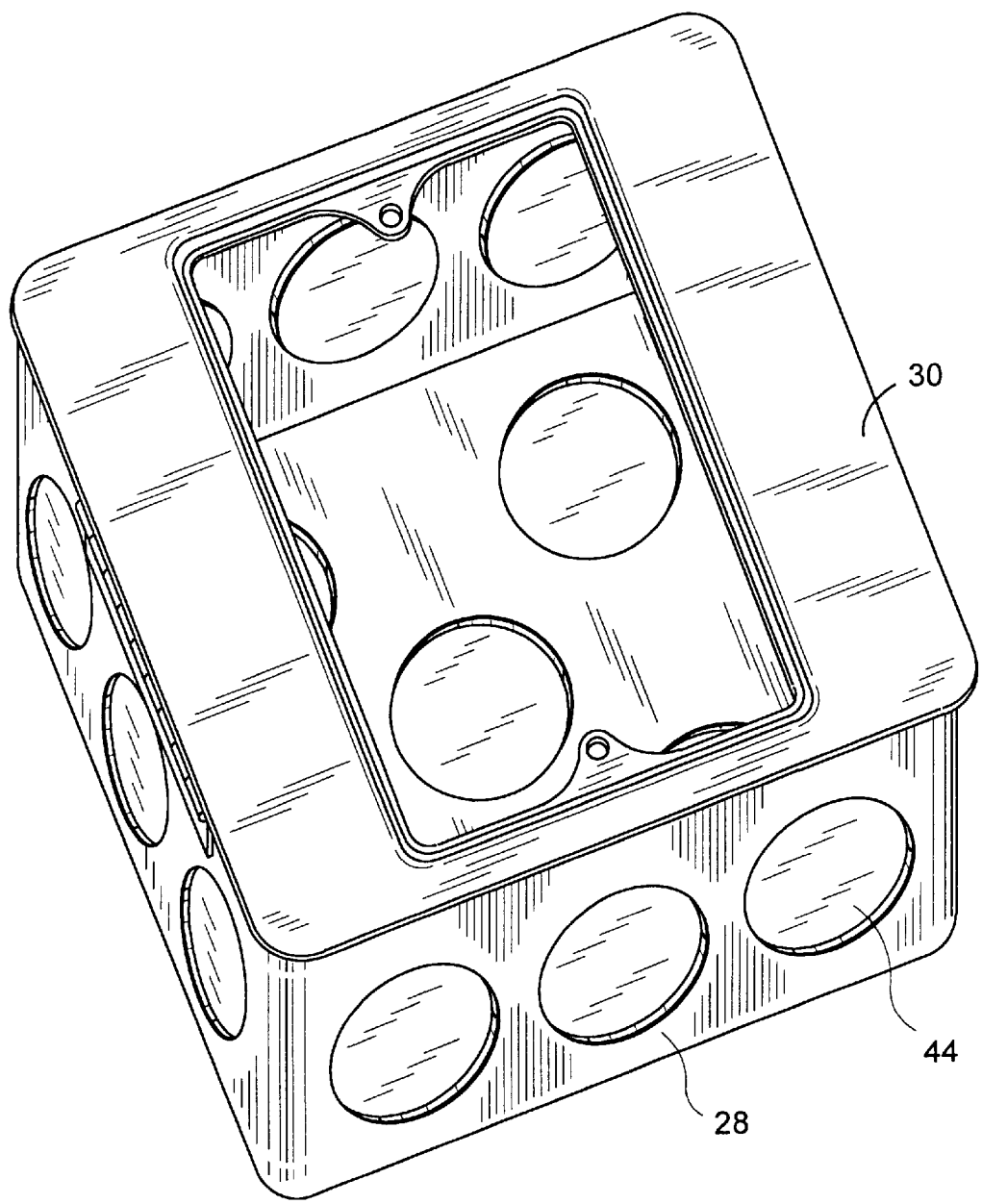
FIG. 5 is a schematic illustration of the electrical box and adaptor combination in a closed position in accordance with the present invention.

Adaptor 30 is generally frame-shaped and in essence narrows the opening of electrical box 28 to permit easy attachment of a desired electrical device such as a switch, an outlet, a telephone jack, etc. Any such electrical device can easily be connected to adaptor 30 by means of opposing mounting ears 46 and 48. Mounting ear 46 includes a screw hole 47 and mounting ear 48 includes a screw hole 49. The choice of the actual electrical device to be incorporated on adaptor 30 by screws is easily interchangeable since all such electrical devices have a standard size according to local codes. Adaptor 30 also has a snap-on clip 50 on an edge opposite its hinged edge. Snap-on clip 50 can easily be made to engage with a mating ridge 52 on sidewall 38 when the apparatus is in a closed position as illustrated in FIG. 5.

FIG. 6 is an exploded view of hinge assembly 32. Electrical box 28 and adaptor 30 are coupled by means of a removable center pin 54. It is preferred that pin 54 be easily removable since it would allow for replacements of adaptors having various thicknesses. For instance, if a structure previously had one half inch plywood exterior walls which were to be replaced with five-eighth inch exterior walls, an adaptor having a larger depth can be substituted to maintain flush placement of the electrical device on the exterior wall. In order to permit the substitution of adaptors with wider depths it is necessary that hinge assembly 32 creates a slight gap between sidewall 40 of electrical box 28 and adaptor 30.

FIG. 7 is an exploded view of snap-on clip 50 and FIG. 8 is an exploded view of mating ridge 52. Snap-on clip 50 will engage with mating ridge 52 upon the application of a slight downward pressure on adaptor 30 on electrical box 28. This places adaptor 30 in its closed position. Alternatively, by slightly lifting up on snap-on clip 50 (or adaptor 30), adaptor 30 will disengage from electrical box 28 resulting in achieving an open position. It will be understood by those skilled in the art that other types of fasteners are possible such as magnetic contacts and the like.

Electrical box 28 of the present invention is utilized similarly to prior art electrical boxes. Such electrical boxes isolate cable contacts and terminations to provide safe installation and easy inspection of electrical devices. While in both prior art applications and applications incorporating the present invention, it is essential that the open area of an electrical box be easily accessible to permit electricians to conduct their work, the present invention saves time be eliminating unnecessary steps of unscrewing an adaptor to get to an open (or work) position and the screwing on of the adaptor cover to result in the closed (or installed) position. This advantage is achieved in the present invention at little or no additional cost. In fact, cost savings should result based on speedier installation and the elimination of lost adaptors and screws.

Figure 9:
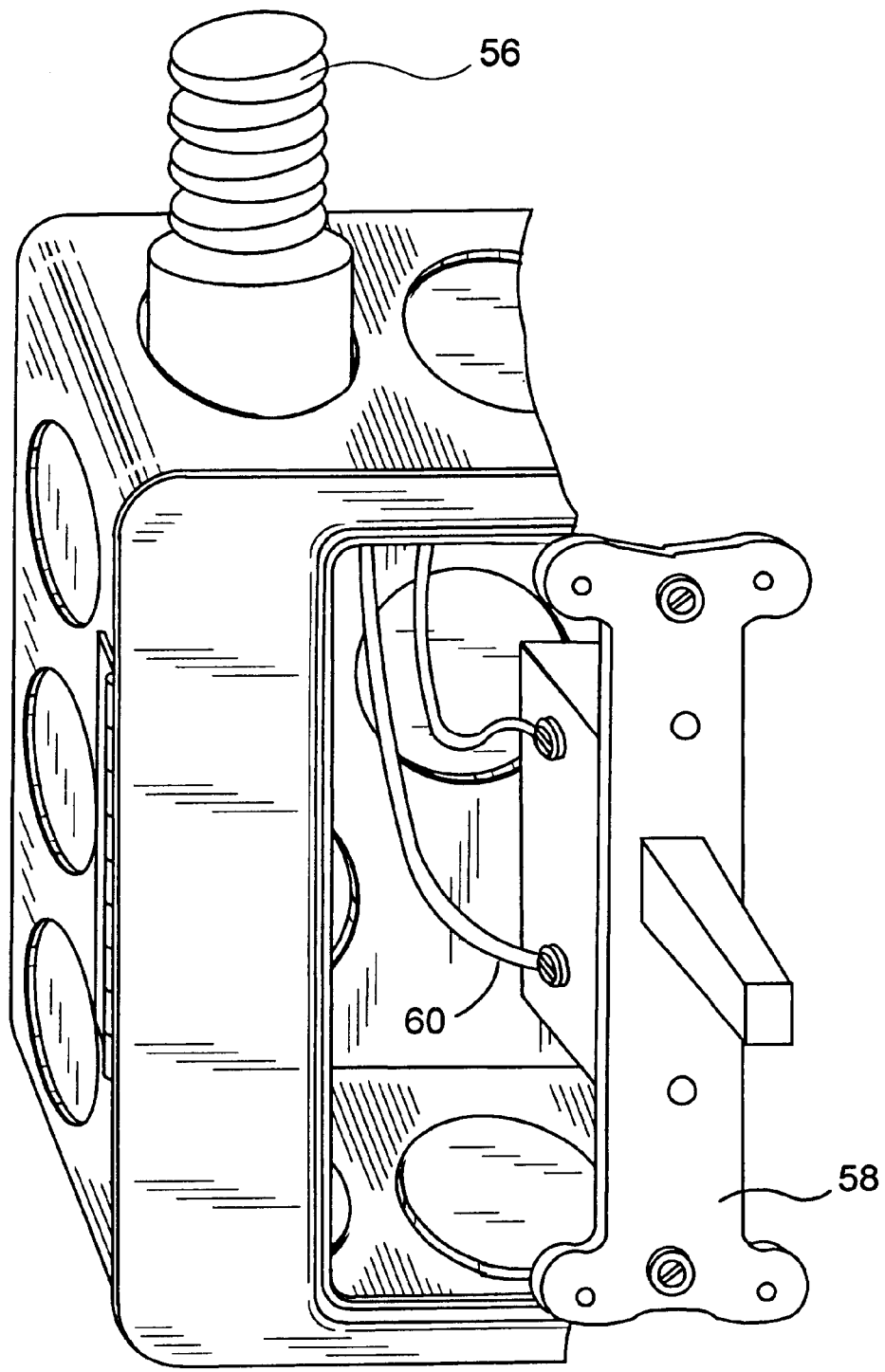
FIG. 9 is a schematic illustration of the attachment of an electrical device coupled to an adaptor in accordance with the present invention.

FIG. 9 is shown to provide a specific example of a cable 56 running into electrical box 28. Furthermore, a specific electric device, in this instance a light switch 58, is shown wherein a power wire 60 and a ground wire 62 are properly coupled to light switch 58.

It will be apparent from the foregoing description that the present invention provides a new and improved electrical box and adaptor combination which provides all the advantages of prior art electrical boxes but greatly facilitates transforming the combination from its open and closed positions. The easy conversion of the combination from its open and closed positions results in significant cost savings both with respect to time expended in an installation, repair or inspection and avoiding the necessity of maintaining excessive spare parts.

It will be understood by those skilled in the art that although the claims are drafted with respect to electrical cables such cables are intended to refer to electrical wires, telephone wires, or any other circuitry means for transporting electrical signals. Furthermore, it is clearly foreseen that electrical devices might include not only conventional devices such as switches and outlets, but also retina detectors, infra red detectors, and the like used in more high technological applications.

While there has been shown and described what is presently considered to be the preferred embodiment of this invention, it will be obvious to those skilled in the art that various changes and modifications may be made without departing from the broader aspects of this invention. For instance, although the sidewalls have been illustrated to incorporate punch-outs. there also exists electrical boxes which instead have existing pre-cut square or circular holes. Furthermore, although the electrical boxes have been illustrated as being square, certain rectangular boxes also exist.

It is, therefore, aimed in the appended claims to cover all such changes and modifications as fall within the true scope and spirit of the invention.

I claim:

1. An electrical housing assembly adapted to be affixed behind a finished surface and to receive an electrical device which will be exposed outwardly from said finished surface, said housing assembly comprising:

an electrical box formed by a rigid back plate, having two opposing surfaces and edges thereon, and four rigid sidewalls, each having two opposing surfaces and edges thereon, said sidewalls extending perpendicularly from said edges of said back plate thereby creating a protected housing area which has an accessible open side which is defined by said edges of said four sidewalls extending away from said back plate and wherein at least one of said surfaces of said back plate and said four sidewalls is adapted to permit a cable to enter said protected housing area;

a frame-shaped flat adaptor adapted to affix an electrical device thereto which is attached to said electrical box by a hinge assembly coupled between one edge of said adaptor and one of said sidewalls whereby said adaptor has a closed position whereby it covers said open side of said protected housing area and an open position whereby said open side of said protected housing area is exposed;

two mounting ears on said adaptor to permit easy coupling of said electrical device to said electrical housing assembly; and a detachable fastener for securing said adaptor over said open side of said protected housing area when said adaptor is in said closed position.

2. The electrical housing assembly of claim 1 wherein at least one of said surfaces of said back plate and said four sidewalls includes a punch-out.

3. The electrical housing assembly of claim 1 wherein said hinge assembly includes a removable pin.

4. The electrical housing assembly of claim 1 wherein said fastener includes a snap-on clip on said adaptor which couples and decouples with a mating ridge on said electrical box.

\* \* \* \* \*